United States Patent [19]

Hazen

[11] 3,848,379
[45] Nov. 19, 1974

[54] REVERSIBLE TRIM STRIP WITH ATTACHED GASKET FOR AN UNDERFLOOR ELECTRICAL CABLE TRENCH

[75] Inventor: John O. Hazen, Monaca, Pa.

[73] Assignee: H. H. Robertson Company, Pittsburgh, Pa.

[22] Filed: Jan. 10, 1973

[21] Appl. No.: 322,397

[52] U.S. Cl................ 52/221, 49/485, 49/489, 52/309, 52/403
[51] Int. Cl.................... E04b 5/48, E04f 17/08
[58] Field of Search ........... 52/221, 394, 403, 309; 49/484, 485, 489; 404/65

[56] References Cited
UNITED STATES PATENTS

| 1,877,729 | 9/1932 | Chaffee | 49/488 |
|---|---|---|---|
| 2,156,681 | 5/1939 | DeWhirst | 404/65 |
| 2,801,450 | 8/1957 | Funke | 49/489 |
| 3,368,311 | 2/1968 | Fork | 52/221 X |
| 3,593,472 | 7/1971 | Bargar | 52/221 |

FOREIGN PATENTS OR APPLICATIONS

| 1,180,644 | 2/1970 | Great Britain | 49/496 |
|---|---|---|---|

Primary Examiner—Alfred C. Perham
Attorney, Agent, or Firm—Harry B. Keck; George E. Manias

[57] ABSTRACT

A reversible trim strip for use in an underfloor electrical cable trench. The reversible trim strip comprises a tile-stop extension and a torque angularly disposed with respect to one another, and a gasket element integrally formed with the tile-stop extension and extending angularly therefrom in a direction opposite to that of the tongue. The tile-stop and tongue may be formed from a rigid plastic whereas the integral gasket element is formed from a flexible plastic — the trim strip being formed in a single extrusion operation. The reversible trim strip may be installed in the linear screed strips of the electrical cable trench, in either of two alternative positions. Namely, in a first position wherein the tongue is vertically presented and in a second position wherein the tile-stop extension is vertically presented. In either position, the integral gasket element underlies the cover plate edge and provides an effective watertight seal.

11 Claims, 4 Drawing Figures

PATENTED NOV 19 1974  3,848,379

REVERSIBLE TRIM STRIP WITH ATTACHED GASKET FOR AN UNDERFLOOR ELECTRICAL CABLE TRENCH

BACKGROUND OF THE INVENTION

1. Field of the Invention

This invention relates to an electrical trench especially adapted for use in underfloor installations of a modern building, and more particularly to a reversible trim strip for use therein, which has a gasket element integrally formed therewith.

2. Description of the Prior Art

Underfloor electrical trench assemblies are known which incorporate reversible L-shaped trim strips and gasket strips as distinct elements. See U.S. Pat. Nos. 3,204,378 (STUESSEL et al. 1965); 3,262,238 (FORK 1966); 3,368,311 (FORK 1968); 3,435,568 (HOSEASON et al. 1969); 3,494,084 (HAZEN 1970); 3,494,381 (FORK 1970); 3,494,651 (FORK et al. 1970).

Such underfloor electrical trench assemblies comprise, in part, a pair of spaced-apart linear screed strips, usually extruded from aluminum or similar ductile metals to include a horizontal lengthwise slot, and a cover plate, usually fabricated from steel plate, spanning the distance between the spaced-apart linear screed strips. A gasket strip is positioned on each of the linear screed strips for engagement by a cover plate side portion. L-shaped reversible trim strips are provided each presenting a tongue and a tile-stop extension. Initially, the tile-stop extensions are disposed in the slots and the trim strip tongues are vertically presented whereby the electrical trench is flush with the concrete screed prior to and during the pouring and hardening of the concrete floor covering layer. After the hardening of the concrete layer, the cover plates are removed and the trim strips are reversed whereby the tongues are presented within the slots and the tile-stop extensions are vertically presented and extend above the screed level by the thickness of the anticipated decorative floor covering material.

Prior art gasket strips presents several disadvantages. For example, the gasket strips have been known to adhere to either the cover plate or the linear screed member or both after an extended period of time. When several cover plates are removed to gain access to the interior of the trench header, one or more of the gasket strips may adhere to the cover plates. When installing the cover plates, the gasket strips may be dislodged and if not noticed, may be left out of the trench assembly, thereby destroying the essential watertight seal.

In certain prior art trench assemblies the cover plates rest on leveling screws, and in still other prior art trench assemblies, the cover plates rest on a segment of the reversible trim strip. In either arrangement the absence of the gasket strip is not visually discernible and the loss of the essential watertight seal is unnoticed.

SUMMARY OF THE INVENTION

The principal object of this invention is to provide a positive and effective means by which inadvertent loss of the gasket strip during removal and reinstallation of the cover plate and during reversal of the trim strip is prevented.

Another object of this invention is to provide a reversible L-shaped trim strip and a gasket element formed as an integral unit.

A further object of this invention is to provide, as an integral unit, a reversible L-shaped trim strip formed of rigid plastic and a gasket element formed of flexible plastic.

Still another object of this invention is to provide an improved electrical trench assembly incorporating the combined reversible trim strip and gasket element of this invention.

The present invention provides a reversible trim strip comprising a tile-stop extension, a tongue joined to and extending angularly from the tile stop extension and a gasket strip joined to the tile-stop extension and extending angularly therefrom in a direction opposite to that of the tongue. In the preferred embodiment, the tile-stop extension and the tongue are mutually perpendicular and the gasket strip extends at an obtuse angle with respect to the tile-stop extension and the tongue. The reversible trim strip comprises a single piece of dual-durometer plastic material, wherein the tile-stop extension and the tongue are formed from rigid plastic material and the gasket strip is formed from flexible plastic material. The dual-durometer plastic material may comprise polyvinyl chloride. To enhance the watertight seal provided by the gasket strip, plural flexible fingers may extend from each of the opposite faces of the gasket strip.

The present invention also provides improvements in an electrical trench assembly of the type incorporating a pair of spaced-apart linear screed strips, and a cover plate spanning the distance between the screed strips and having lateral edge portions of its bottom surface confronting supporting ledges presented by the screed strips. Each screed strip is provided with a screed lip disposed laterally of and above the supporting ledge. Each screed strip has a lengthwise slot located beneath the upper surface of the screed lip and extending laterally away from the cover plate. Each screed lip is spaced-apart from the adjacent side edge of the cover plate to provide a space for receiving either the tongue or the tile-stop extension of the reversible trim strip, depending on the orientation of the trim strip. That is, during shipment and installation of the trench assembly and during pouring of the concrete layer, the tongue is vertically presented in the space between the screed lip and the side edge of the cover plate. The tile-stop extension extends into the lengthwise slot of the screed strip. After the concrete layer has hardened, the cover plate is removed and the trim strip is reversed such that the tile-stop extension is vertically presented in the space between the screed lip and the side edge of the cover plate. The tile-stop extension has an upper extremity elevated above the screed lip and the upper surface of the cover plate. The tongue extends into and is locked within the lengthwise slot of the screed strip. In either orientation of the reversible trim strip, the integral gasket strip is positioned between the lateral edge portion of the cover plate and the supporting ledge of the screed strip.

DESCRIPTION OF THE PREFERRED EMBODIMENT(S)

Figure 1:
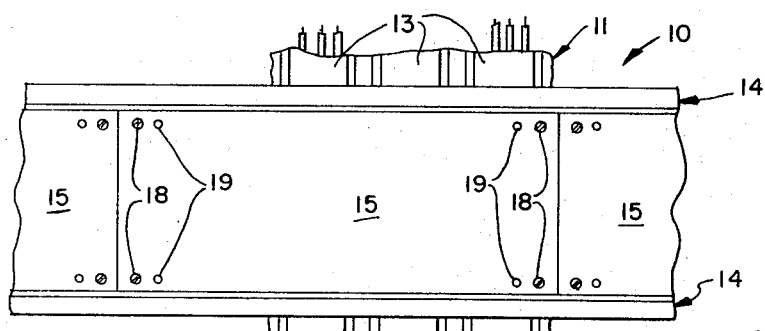
FIG. 1 is a fragmentary plan view of an electrical trench assembly incorporating a pair of the present reversible trim strip.

FIG. 1 illustrates, in plan view, an electrical trench assembly identified generally by the numeral 10. The trench 10 is positioned, in a preferred environment, above metal cellular flooring sections 11 and serves to protect, enclose and distribute electrical conductors 12 into and out from the raceways 13 of the metal cellular flooring 11. The trench 10 may comprise the type which incorporate a U-shaped base pan to provide a complete enclosure for the conductors passing therethrough. See for example U.S. Pat. Nos. 3,494,084 (HAZEN 1970); 3,494,651 (FORK et al. 1970). Alternatively, the trench 10 may comprise that bottomless trench-forming sub-assembly including sub-rails, described and claimed in copending application Ser. No. 158,769 filed July 1, 1971 and assigned to the assignee of the present invention.

In either of the cited trench assemblies, the trench 10 (FIGS. 1 and 4) includes a pair of spaced-apart linear screed strips 14 and at least one cover plate 15 spanning the distance between the linear screed strips 14. Leveling means, such as leveling screws 16 (FIG. 4) connect each linear screed strip 14 to a horizontal flange 17 forming part of the U-shaped base pan of the trench headers of U.S. Pat. Nos. 3,494,084; 3,494,651 supra; of the sub-rail of the trench of copending application Ser. No. 158,769. In either instance, the horizontal flanges 17 is at a fixed distance relative to the crests of the metal cellular flooring 11. Each cover plate is temporarily secured to the linear screed strips 14 by temporary fasteners 18. Access openings 19 are provided through the cover plate 15 to permit entry of a screw-head turning implement such as a screwdriver tip. The leveling screw 16 thus can be turned relative to its threaded engagement with the horizontal flange 17 to provide vertical adjustments in the level of the linear screed strips 14 relative to the metal cellular flooring 11. When the temporary fasteners 18 are removed, the cover plate 15 is resiliently connected to the linear screed elements by resilient fasteners 20 engageable with inwardly extending beads 21 presented by the linear screed strips 14.

Figure 2:
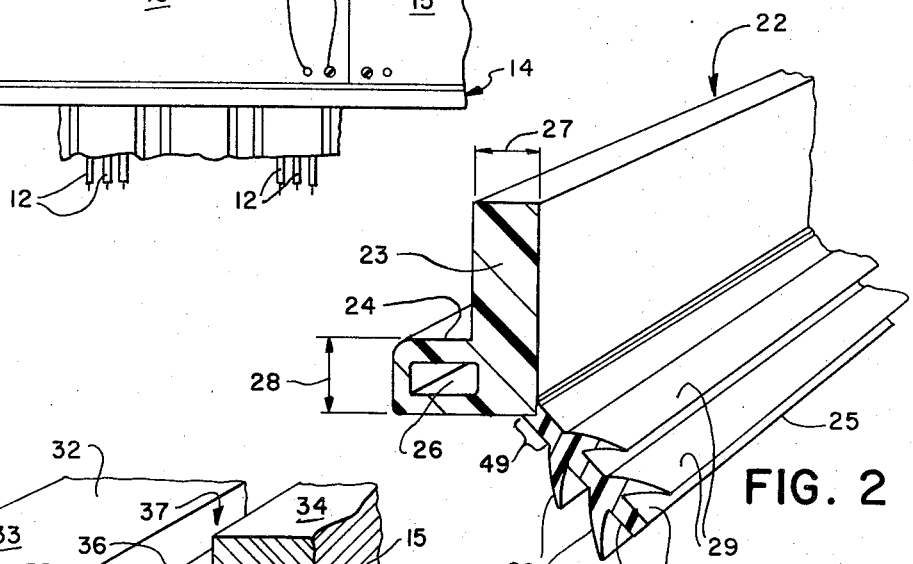
FIG. 2 is a perspective view of the present reversible trim strip.
Figure 4:
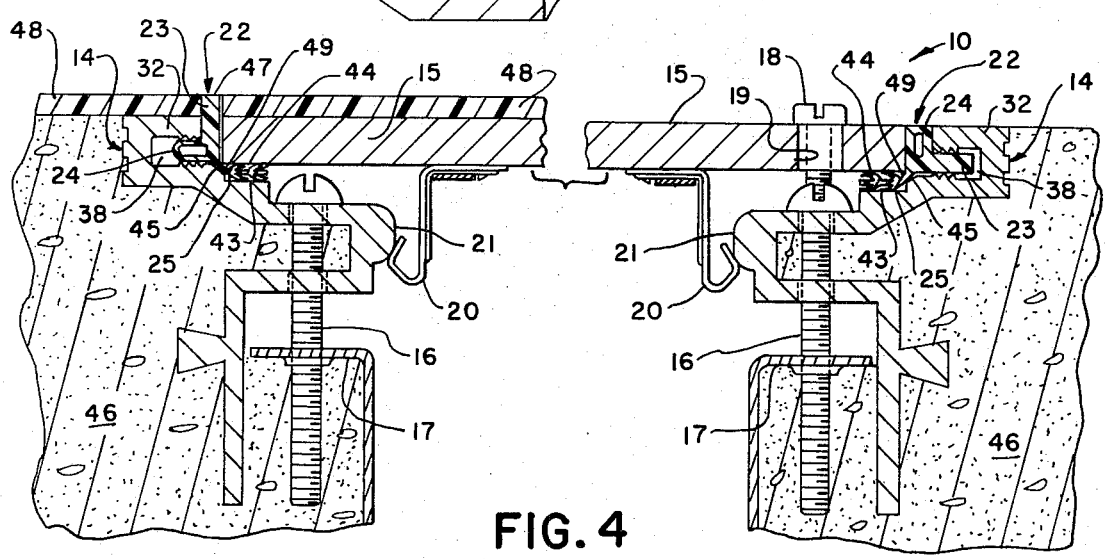
FIG. 4 is a fragmentary broken cross-sectional view taken transversely through the electrical trench assembly of FIG. 1, illustrating the present reversible trim strip in two alternative positions.

In accordance with the present invention, the trench assembly 10 is provided with reversible trim strips 22 which are illustrated in FIG. 4 in two alternative positions. The trim strip 22 (FIG. 2) includes, as a unitary structure, a tile-stop extension 23, a tongue 24 and a gasket strip 25. The tongue 24 is joined to and extends angularly from the tile-stop extension 23. For example, the tile-stop extension 23 and the tongue 24 may be mutually perpendicular as illustrated in FIG. 2. The gasket strip 25 is joined to the tile-stop extension 23 and extends angularly therefrom in a direction opposite to that of the tongue 24. The gasket strip 25 extends at an obtuse angle, for example 135°, with respect to the tile-stop extension 23 and the tongue 24. The tongue 24 is provided with a lengthwise passageway 26 which renders the tongue 24 flexible for a purpose hereinafter to be described. The tile-stop extension 23 has a width 27 which is less than the width 28 of the tongue 24.

The gasket strip 25 may be provided with plural flexible fingers 29 extending from the opposite faces 30, 31 of the gasket element 25. The plural flexible fingers 29 extending from the opposite faces 30, 31 of the gasket element 25. The plural flexible fingers 29 preferably extend in a direction away from the tile-stop extension 23 and the tongue 24.

Further in accordance with the present invention, the reversible trim strip 22 comprises a single piece of dual-durometer plastic material, such as polyvinyl chloride. The dual-durometer trim strip 22 may be formed as a unitary structure, by an extrusion process wherein plastic materials resulting in different hardness products are fed into a single die. In the present reversible trim strip 22, the tile-stop extension 23 and the tongue 24 comprise a hard or rigid plastic having a durometer reading of 90 Shore B, for example. The gasket element 25 comprises a soft or flexible plastic material having a durometer reading in the range of 65 to 70 Shore A, for example.

Figure 3:
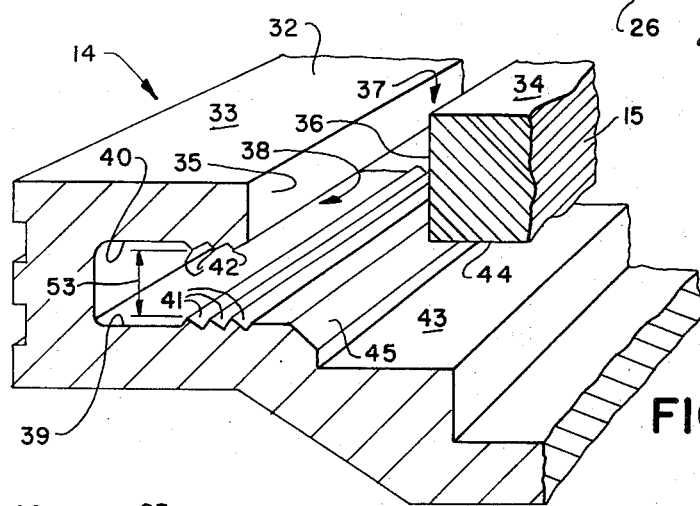
FIG. 3 is a fragmentary perspective view of a linear screed strip illlstrating the screed lip and lengthwise slot.

Referring to FIG. 3, each of the linear screed strips 14 is provided with a screed lip 32 having an upper surface 33 which is coplanar with the upper surface 34 of the cover plate 15. The screed lip 32 presents a side edge 35 which is spaced-apart from the confronting side edge of the cover plate 15 to provide a space 37 therebetween. The linear screed strip 14 is provided with a lengthwise slot 38 located beneath the upper surface 33 of the screed lip 32. The lengthwise slot 38 presents bottom and upper surfaces 39, 40. Plural lengthwise serrations 41, 42 are provided in the surfaces 39, 40 at the entrance of the slot 38. The distance between the crests of the serrations 41, 42 is indicated at 53. The linear screed strip 14 is provided with an upwardly presented supporting ledge 43 which confronts a lateral edge portion 44 of the bottom surface of the cover plate 15. The supporting ledge 43 is spaced entirely below the bottom surface 39 of the lengthwise slot 38. The linear screed strip 14 also is provided with a beveled surface 45 extending between the bottom surface 39 of the lengthwise slot 38 and the supporting ledge 43.

It will be observed in the right hand portion of FIG. 4 that the reversible trim strip 22 is disposed in an initial position wherein the tile-stop extension 23 extends into the slot 38 and the tongue 24 is vertically presented in the space between the screed lip 32 and the cover plate 15. The top of the tongue 24 is flush with the upper surfaces 33, 34 (FIG. 3) of the screed lip 32 and the cover plate 15. The concrete layer 46, when poured may be screeded to a level flush with the upper surface of the screed lip 32.

After the concrete layer 46 has hardened, the cover plate is removed and the trim strip 22 is reversed. It will be appreciated that the width 27 (FIG. 2) of the tile-stop extension 23 is less than the distance 53 (FIG. 3) between the crests of the serrations 41, 42. Thus the tile-stop extension 23 may be readily introduced into or withdrawn from the lengthwise slot 38. The trim strip 22 is now disposed in that position illustrated in the left hand portion of FIG. 4, that is, with the tongue 24 extending into the recess 38 and with the tile-stop extension 23 vertically presented. When the tongue 24 is introduced into the slot 38 (FIG. 4), the width 28 is reduced and the serrations 41, 42 (FIG. 3) grip the opposite surfaces of the tongue 24, whereby the tongue 24 is securely retained within the slot 38. It will be observed in FIG. 4 that the tile-stop extension has an upper extremity 47 elevated above the screed lip 32 and the cover plate 15 at a distance equal to the thickness of the anticipated decorative floor covering material 48.

It will be observed in FIG. 4 that in either of the illustrated positions of the reversible trim strip 22, the gasket strip 25 is disposed between the supporting ledge 43 of the linear screed strip 14 and the lateral edge portion 44 of the bottom surface of the cover plate 15. Also, the gasket strip 25 presents a gasket portion 49 (FIG. 2) positioned immediately adjacent to the tile-stop extension 23 and which overlies the bevelled surface 45 (FIG. 4) of the linear screed strips 14. It will be appreciated that the gasket strip 25, being an integral component of the trim strip 22, can never be inadvertently omitted from the trench assembly 10. Moreover, the configuration of the trim strip 22 assures the proper positioning of the gasket strip 25 with respect to the supporting ledge 43 and the lateral edge portions 44 of the bottom surface of the cover plate 15.

I claim:

1. In an underfloor electrical trench assembly having spaced-apart linear screed strips presenting horizontally disposed, upwardly presented supporting ledges; a cover plate spanning the distance between said linear screed strips and having lateral edge portions of its bottom surface confronting said supporting ledges; screed lips, one presented above the level of each linear screed strip and laterally spaced-apart from the adjacent side edge of said cover plate thereby to provide a space therebetween; the improvement comprising:

reversible trim strips, one for each linear screed strip and being reversible relative to the linear screed strip between first and second strip positions, each of said reversible trim strips comprising:

a tile-stop extension;

a tongue joined to said tile-stop extension, the height of said tongue being less than that of said tile-stop extension, and a gasket strip joined to and extending angularly from said tile-stop extension and said tongue;

said tongue being disposed in said space with an upper edge thereof substantially coplanar with the upper surface of said cover plate when said trim strip is in the first strip position;

said tile-stop extension being disposed in said space with an upper extremity thereof elevated above the upper surface of said cover plate when said trim strip is in the second strip position; and said gasket strip being disposed between said supporting ledge and the lateral edge portion of the bottom surface of said cover plate when said trim strip is in said first strip position and in said second strip position.

2. The reversible trim strip of claim 1 wherein said reversible trim strip comprises a single piece of dual-durometer plastic material.

said tile-stop extension and said tongue being formed of rigid plastic material, and said gasket strip being formed from flexible plastic material.

3. The reversible trim strip of claim 2 wherein said dual-durometer plastic material comprises polyvinyl chloride.

4. The reversible trim strip of claim 1 wherein said gasket strip has opposite faces, and plural flexible fingers extending from each of said opposite faces.

5. The reversible trim strip of claim 4 wherein said plural flexible fingers extend from said opposite faces in a direction away from said tile-stop extension and said tongue.

6. In an underfloor electrical trench assembly having spaced-apart linear screed strips presenting horizontally disposed, upwardly presented supporting ledges; a cover plate spanning the distance between said linear screed strips and having lateral edge portions of its bottom surface confronting said supporting ledges;

screed lips, one integrally formed with each of said linear screed strips and disposed laterally of and above the said supporting ledge and having an upper surface which is substantially coplanar with the upper surface of said cover plate, each screed lip being spaced-apart from the adjacent side edge of said cover plate; and each of said linear screed strips having a lengthwise slot located beneath the upper surface of said screed strip and extending laterally away from said cover plate; the improvement comprising:

a reversible trim strip for each linear screed strip, comprising:

a tile-stop extension, a tongue joined to and extending from said tile-stop extension, the height of said tongue being less than that of said tile-stop extension, and a gasket strip joined to said tile-stop extension and extending angularly from said tile-stop extension and said tongue;

each said trim strip being reversible relative to the linear screed strip, between a first position wherein said tile-stop extension is received within said slot, said tongue is disposed between said screed lip and said cover plate with the upper edge of said tongue being substantially coplanar with the upper surface of said cover plate, and said gasket strip is disposed between said supporting ledge and the lateral edge portion of the bottom surface of said cover plate; and a second position wherein said tile-stop extension is disposed between said screed lip and said cover plate and has an upper extremity elevated above said screed lip and the upper surface of said cover plate, said tongue is disposed within said lengthwise slot, and said gasket strip is disposed between said supporting ledge and the lateral edge portion of the bottom surface of said cover plate.

7. The improvement of claim 6 wherein said supporting ledges are spaced entirely below the bottom surface of said slot;

said linear screed strip includes a bevelled surface extending between the bottom surface of said slot and said supporting ledge; and said gasket strip presents a portion immediately adjacent to said tile-stop extension which overlies said bevelled surface.

8. The improvement of claim 6 wherein each said gasket strip includes
plural flexible fingers extending from opposite surfaces of said gasket strip into engagement with said supporting ledge and the lateral edge portion of the bottom surface of said cover plate.

9. The improvement of claim 8 wherein said plural flexible fingers extend in a direction away from said tile-stop extension and said tongue.

10. The improvement of claim 6 wherein said reversible trim strip comprises a single piece of dual-durometer plastic material,
said tile-stop extension and said tongue being formed from rigid plastic material, and
said gasket strip being formed from flexible plastic material.

11. The improvement of claim 10 wherein said dual-durometer plastic material comprises polyvinyl chloride.

* * * * *